United States Patent
Bradley et al.

(10) Patent No.: US 9,081,163 B2
(45) Date of Patent: Jul. 14, 2015

(54) FIBER OPTIC CABLE WITH BEND PREFERENCE

(71) Applicant: Corning Optical Communications LLC, Hickory, NC (US)

(72) Inventors: Mark Alan Bradley, Hickory, NC (US); William Welch McCollough, McAdenville, NC (US); James Arthur Register, III, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/264,134

(22) Filed: Apr. 29, 2014

(65) Prior Publication Data

US 2015/0160425 A1    Jun. 11, 2015

Related U.S. Application Data

(63) Continuation of application No. 14/175,442, filed on Feb. 7, 2014, now Pat. No. 8,750,662, which is a continuation of application No. 13/559,102, filed on Jul. 26, 2012, now Pat. No. 8,676,012.

(51) Int. Cl.
  *G02B 6/00* (2006.01)
  *G02B 6/44* (2006.01)
  *G02B 6/42* (2006.01)

(52) U.S. Cl.
  CPC .............. *G02B 6/443* (2013.01); *G02B 6/4206* (2013.01); *G02B 6/4214* (2013.01); *G02B 6/4472* (2013.01)

(58) Field of Classification Search
  CPC .. G02B 6/4206; G02B 6/4292; G02B 6/4214; G02B 6/443; G02B 6/4472
  See application file for complete search history.

(56) References Cited

U.S. PATENT DOCUMENTS

| | | | |
|---|---|---|---|
| 4,038,489 A * | 7/1977 | Stenson et al. | 174/70 R |
| 4,172,106 A | 10/1979 | Lewis | 264/1 |
| 4,525,702 A | 6/1985 | Kitagawa et al. | 340/556 |
| 4,984,869 A | 1/1991 | Roche | 350/96.23 |
| 5,050,957 A | 9/1991 | Hamilton et al. | 385/113 |

(Continued)

FOREIGN PATENT DOCUMENTS

| AU | 740507 B2 | 2/1999 | H01B 7/34 |
|---|---|---|---|
| DE | 2928678 A1 | 1/1981 | G02B 5/16 |

(Continued)

OTHER PUBLICATIONS

D.M. Raymer & D.E. Smith, "Spontaneous Knotting of Agitated String," Oct. 16, 2007, *Proceedings of the National Academy of Sciences of the United States of America*, vol. 104, No. 42, pp. 16432-16437.

(Continued)

*Primary Examiner* — Akm Enayet Ullah
(74) *Attorney, Agent, or Firm* — William D. Doyle

(57) ABSTRACT

A fiber optic cable includes a polymeric jacket, an optical fiber, and first and second longitudinal strength elements. The jacket defines an outer periphery and a cavity interior thereto. The cavity is elongate and the outer periphery is polygonal. The optical fiber is positioned within the cavity of the jacket. The first and second longitudinal strength elements are embedded in the jacket on an opposite sides of the cavity from one another. The cable resists bending in a non-preferential plane by no more than five times as much as the cable resists bending in a preferential plane.

20 Claims, 3 Drawing Sheets

(56) References Cited

U.S. PATENT DOCUMENTS

| | | | |
|---|---|---|---|
| 5,138,685 A | 8/1992 | Arroyo et al. | 385/113 |
| 5,163,116 A * | 11/1992 | Oestreich et al. | 385/111 |
| 5,319,730 A | 6/1994 | Räsänen et al. | 385/114 |
| 5,469,523 A | 11/1995 | Blew et al. | 385/101 |
| 5,509,097 A | 4/1996 | Tondi-Resta et al. | 385/113 |
| 5,542,020 A | 7/1996 | Horska | 385/112 |
| 5,547,396 A | 8/1996 | Jordhamo | 439/604 |
| 5,557,698 A | 9/1996 | Gareis et al. | 385/101 |
| 5,651,081 A | 7/1997 | Blew et al. | 385/101 |
| 5,668,912 A | 9/1997 | Keller | 385/100 |
| 5,740,295 A | 4/1998 | Kinard et al. | 385/109 |
| 5,960,144 A | 9/1999 | Klumps et al. | 385/113 |
| 5,970,196 A | 10/1999 | Greveling et al. | 385/114 |
| 5,999,676 A | 12/1999 | Hwang | 385/106 |
| 6,041,153 A | 3/2000 | Yang | 385/109 |
| 6,137,935 A | 10/2000 | Böhme et al. | 385/109 |
| 6,141,472 A | 10/2000 | Ishikawa et al. | 385/105 |
| 6,198,865 B1 | 3/2001 | Risch | 385/113 |
| 6,233,384 B1 | 5/2001 | Sowell, III et al. | 385/107 |
| 6,241,920 B1 | 6/2001 | Cotter et al. | 264/1.24 |
| 6,249,629 B1 | 6/2001 | Bringuier | 385/113 |
| 6,314,224 B1 | 11/2001 | Stevens et al. | 385/113 |
| 6,343,172 B1 | 1/2002 | Schiestle et al. | 385/101 |
| 6,377,738 B1 | 4/2002 | Anderson et al. | 385/113 |
| 6,430,344 B1 | 8/2002 | Dixon et al. | 385/109 |
| 6,431,767 B2 * | 8/2002 | Nagasaki | 385/96 |
| 6,434,304 B2 | 8/2002 | Gao et al. | 385/109 |
| 6,519,396 B2 | 2/2003 | Schneider et al. | 385/101 |
| 6,618,526 B2 | 9/2003 | Jackman et al. | 385/102 |
| 6,687,437 B1 | 2/2004 | Starnes et al. | 385/101 |
| 6,738,547 B2 | 5/2004 | Spooner | 385/101 |
| 6,785,452 B2 | 8/2004 | Yasutomi | 385/102 |
| 7,113,680 B2 | 9/2006 | Hurley et al. | 385/113 |
| 7,127,144 B2 | 10/2006 | Lee | 385/101 |
| 7,289,704 B1 | 10/2007 | Wagman et al. | 385/100 |
| 7,627,218 B2 | 12/2009 | Hurley | 385/101 |
| 7,643,713 B2 | 1/2010 | Büthe et al. | 385/101 |
| 7,778,510 B2 | 8/2010 | Aronson et al. | 385/101 |
| 7,787,727 B2 | 8/2010 | Bringuier et al. | 385/113 |
| 7,920,764 B2 | 4/2011 | Kewitsch | 385/101 |
| 8,676,012 B2 | 3/2014 | Bradley et al. | 385/101 |
| 2002/0041743 A1 | 4/2002 | Schneider et al. | 385/101 |
| 2002/0126967 A1 | 9/2002 | Panak et al. | 385/101 |
| 2002/0141713 A1 | 10/2002 | Okada et al. | 385/113 |
| 2002/0159727 A1 | 10/2002 | Okada et al. | 385/109 |
| 2003/0023247 A1 | 1/2003 | Lind et al. | 606/127 |
| 2003/0072545 A1 | 4/2003 | Kusakari et al. | 385/101 |
| 2003/0118298 A1 | 6/2003 | Matsuyama et al. | 385/110 |
| 2003/0165310 A1 | 9/2003 | Moon et al. | 385/113 |
| 2003/0235379 A1 | 12/2003 | Lin | 385/101 |
| 2004/0057681 A1 | 3/2004 | Quinn et al. | 385/110 |
| 2005/0017495 A1 | 1/2005 | Arnold | 280/806 |
| 2006/0088251 A1 | 4/2006 | Wang et al. | 385/88 |
| 2006/0291787 A1 | 12/2006 | Seddon | 385/113 |
| 2008/0037941 A1 | 2/2008 | Mallya et al. | 385/101 |
| 2008/0037942 A1 | 2/2008 | Tatat | 385/113 |
| 2008/0118211 A1 | 5/2008 | Seddon et al. | 385/114 |
| 2010/0008631 A1 | 1/2010 | Herbst | 385/101 |
| 2010/0209058 A1 | 8/2010 | Ott | 385/101 |
| 2010/0316340 A1 | 12/2010 | Sales Casals et al. | 385/101 |
| 2010/0329614 A1 | 12/2010 | Keller et al. | 385/101 |
| 2011/0083898 A1 | 4/2011 | Miller, III | 174/70 R |
| 2011/0229097 A1 | 9/2011 | Roberts et al. | 385/101 |
| 2012/0301090 A1 | 11/2012 | Cline et al. | 385/103 |
| 2012/0315004 A1 | 12/2012 | Register, III et al. | 385/101 |
| 2012/0328253 A1 | 12/2012 | Hurley et al. | 385/103 |
| 2013/0188916 A1 | 7/2013 | Bradley et al. | 385/113 |
| 2014/0064679 A1 | 3/2014 | Register, III et al. | 385/101 |

FOREIGN PATENT DOCUMENTS

| | | | |
|---|---|---|---|
| DE | 19628457 A1 | 1/1998 | H01B 11/22 |
| DE | 29716946 U1 | 1/1999 | G02B 6/44 |
| EP | 0676654 A2 | 10/1995 | G02B 6/44 |
| EP | 0945876 A1 | 9/1999 | H01B 11/22 |
| EP | 0767754 B1 | 7/2000 | B65D 90/00 |
| EP | 1061394 B1 | 11/2009 | G02B 6/44 |
| FR | 2555764 A1 | 5/1985 | G02B 6/44 |
| GB | 2123164 A | 1/1984 | G02B 5/14 |
| GB | 2233788 A | 1/1991 | H01B 11/22 |
| JP | 3-20704 A | 1/1991 | G02B 6/44 |
| JP | 3-52529 A | 3/1991 | H02K 5/00 |
| JP | 7-174949 A | 7/1995 | G02B 6/44 |
| JP | 9-152529 A | 6/1997 | G02B 6/44 |
| JP | 11-160594 A | 6/1999 | G02B 6/46 |
| JP | 2000-276955 A | 10/2000 | H01B 11/22 |
| WO | WO 01/98810 A1 | 12/2001 | G02B 6/44 |

OTHER PUBLICATIONS

U.S. Appl. No. 13/596,256, Register et al., filed Aug. 28, 2012, 38 pages.

Notice of Allowance, U.S. Appl. No. 13/559,102, Mailed on Sep. 27, 2013, 10 pages.

Non-Final Office Action, U.S. Appl. No. 13/489,867, Mailed on Dec. 11, 2013, 10 pages.

Notice of Allowance, U.S. Appl. No. 13/489,867, Mailed on Jan. 14, 2014, 8 pages.

Patent Cooperation Treaty, International Search Report for International Application No. PCT/US2012/040856, Mailed on Aug. 31, 2012, 4 pages.

European Patent Office, Extended Search Report for European Application No. 11158852.1, Mailed on Oct. 28, 2013, 10 pages.

* cited by examiner

FIBER OPTIC CABLE WITH BEND PREFERENCE

RELATED CASES

This Application is a continuation of U.S. application Ser. No. 14/175,442 filed on Feb. 7, 2014, which is a continuation of U.S. application Ser. No. 13/559,102 filed on Jul. 26, 2012, which issued on Mar. 18, 2014 as U.S. Pat. No. 8,676,012, the content of each of which is relied upon and incorporated herein by reference in its entirety, and the benefit of priority under 35 U.S.C. §120 is hereby claimed.

BACKGROUND

Aspects of the present disclosure relate generally to a fiber optic cable configured for use in very-short-distance networks, and particularly configured to facilitate manual handling of the cable and associated hardware due to the size, structure, and bend characteristics of the cable.

Consumer cables commonly have a round profile without a preferential bend, attributes that are beneficial for making the cables easy to handle, but that also create problems with tangling and spontaneous knot formation of cables. Such problems may particularly effect small, round-bodied flexible cords, wires, ropes, or cables, because such linear objects, without a preferential bend, generally lack resistance opposing motion once moving radially or perpendicularly to their body-length. So such cables, when jostled, may undergo random movements that result in spontaneous knot formation.

Other fiber optic cables are manufactured to have a strong bend preference, on the order of 10-to-1 or more, so as to prevent the cable from bending in a direction that may increase fiber attenuation. However, such cables are usually not intended for consumer handling, but instead may be buried underground or aerially supported by telephone poles. These latter cables are generally too stiff to be manually maneuvered in very-short-distance network applications, such as temporarily connecting a laptop computer and a smart phone for downloads or uploads.

Small consumer cables, on the order of three millimeters in diameter, may use strength elements to induce a bend preference. However, the strength elements also pose a danger for attenuating the optical fibers supported by the cables, because bending of the cables off of the preferential bend axis may cause the strength members to move to the neutral axis, pinching or pressuring the optical fibers. Accordingly, a need exists for a consumer cable configured to facilitate manual handling of the cable and associated hardware by having a structure that allows for ease in maneuvering while mitigating the occurrence of tangling and knot formation and protecting the optical fibers from attenuation and damage due to pinching or crushing.

Furthermore, the particularly small size and unconstrained cable movement of some such consumer cables further complicates the process of accessing optical fibers in such cables for attaching connectors or tethers during manufacturing. For example, it may be difficult to cut a lengthwise slit in a knotted cable of particularly small diameter in order to access optical fibers inside. As such, attaching connectors or furcating ends of small consumer cables may be difficult as well as time consuming. Accordingly, a need exists to mitigate some or all of the above-described problems.

SUMMARY

One embodiment relates to a fiber optic cable that includes a polymeric jacket defining an outer periphery and a cavity interior thereto, an optical fiber positioned within the cavity of the jacket, a first longitudinal strength element fully embedded in the jacket, and a second longitudinal strength element fully embedded in the jacket on an opposite side of the cavity from the first strength longitudinal member. The cavity is elongate. The first and second longitudinal strength elements define a bend axis of the cable passing through the strength elements that is orthogonal to the length of the cable, where the bend axis and the length of the cavity define a preferential plane for bending. The cable resists bending about a third axis that is orthogonal to the length of the cable and also orthogonal to the bend axis, where the third axis and the length of the cable define a non-preferential plane for bending. The cable resists bending in the non-preferential plane by at least twice but no more than five times as much as the cable resists bending in the preferential plane. As such, the difference in flexural rigidity between the preferential and non-preferential planes limits the formation of spontaneous knots in a coil of the cable while still providing flexibility for ease of handling that is commensurate with consumer expectations.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1A:
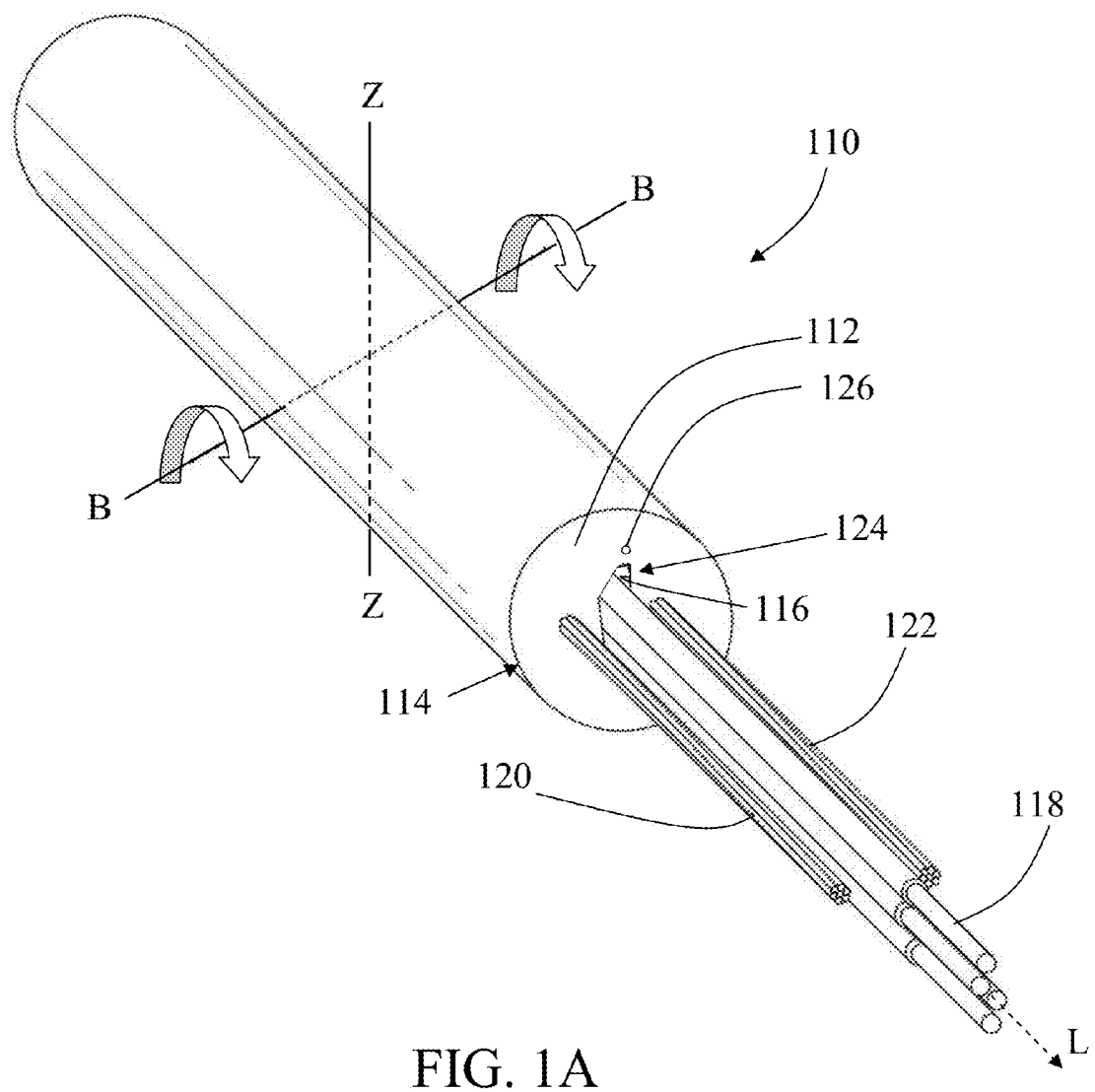
FIG. 1A is a perspective view of a fiber optic cable according to an exemplary embodiment.
Figure 1B:
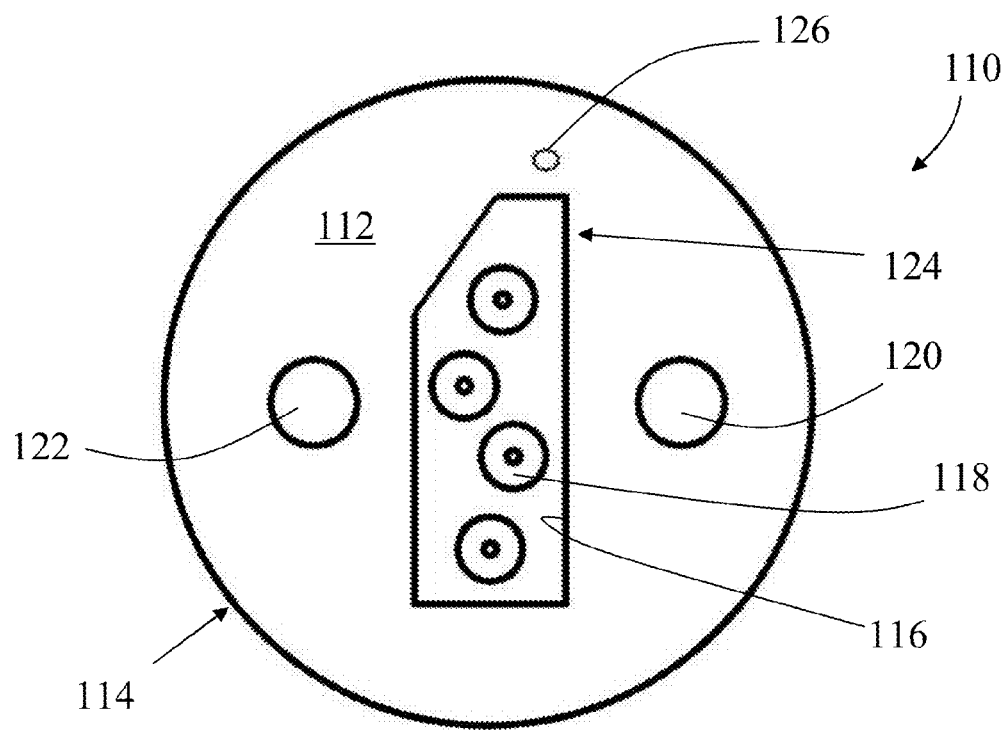
FIG. 1B is a sectional view of the fiber optic cable of FIG. 1A.

Referring to FIGS. 1A-1B, a fiber optic cable 110 that includes a polymeric jacket 112 defining an outer periphery 114 and a cavity 116 interior thereto and an optical fiber 118 positioned within the cavity 116 of the jacket 112. The fiber optic cable 110 further includes a first longitudinal strength element 120 fully embedded in the jacket 112, and a second longitudinal strength element 122 fully embedded in the jacket 112 on an opposite side of the cavity 116 from the first strength longitudinal member 120. In some embodiments, the cavity 116 is elongate.

According to an exemplary embodiment, the first and second longitudinal strength elements 120, 122 define a bend axis B of the cable 110 passing through the strength elements 120, 122 that is orthogonal to the length of the cable L (e.g., central axis, longitudinal centerline), where the bend axis B and the length L of the cavity define a preferential plane BL for bending. The cable resists bending about a third axis Z that is orthogonal to the length L of the cable 110 and also orthogonal to the bend axis B, where the third axis Z and the length L of the cable 110 define a non-preferential plane ZL for bending.

According to an exemplary embodiment, the cable 110 resists bending in the non-preferential plane ZL by at least twice but no more than five times as much as the cable 110 resists bending in the preferential plane BL. In some such embodiments, the cable 110 resists bending in the non-preferential plane ZL by no more than four times as much as the cable 110 resists bending in the preferential plane BL. As such, the difference in flexural rigidity between the preferential and non-preferential planes BL, ZL limits the formation of spontaneous knots in a coil of the cable 110 while still providing flexibility for ease of handling that is commensurate with consumer expectations for common applications of very-short distance network cables.

Furthermore, aside from mitigating spontaneous knot formation and tangling, Applicants have found that the cable 110 having a bend preference in this range also benefits from the ability to be easily and cleanly coiled for storage. If the cable 110 is held vertically with the distal end of the cable 110 on a surface, the cable 110 may be simultaneously twisted and lowered to form a neat, coiled pile on the surface. The coiled pile may then fit nicely into a small storage container or pocket. The size of the storage container can be kept to a minimum because of the tight density of the coiled cable 110. Other cables, without a bend preference, may not coil nicely or neatly, or may require a substantial effort to coil for storage. Still other cables, with too great of a bend preference, may be too stiff and resist bending and coiling, again making their orderly storage a cumbersome process.

Figure 2:
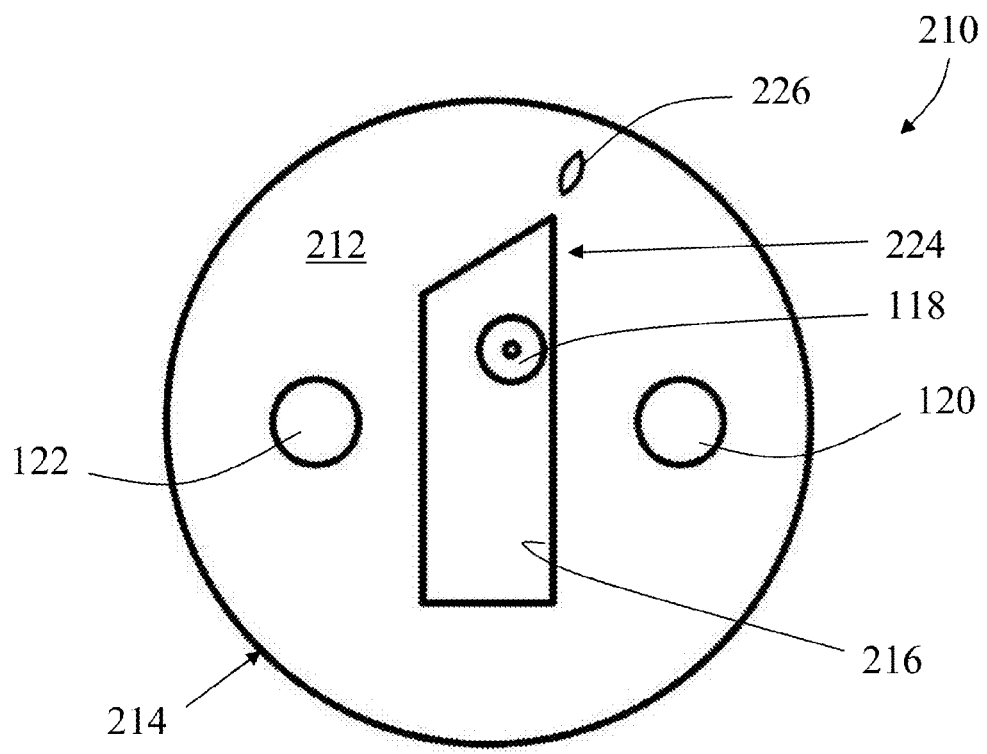
FIGS. 2-4 is are sectional views of fiber optic cables according to other exemplary embodiments.

The relative flexural rigidity of the preferential and non-preferential planes BL, ZL of the cable 110 may be adjusted by manipulating various structural parameters of the cable 110. In FIG. 2, for example, moving the strength elements 120, 122 closer to the lengthwise center of the cable 110 decreases the differential in flexural rigidity between the preferential and non-preferential planes BL, ZL; while moving the strength element 120, 122 further from the center increases the differential. Increasing the rigidity of the strength element 120, 122 (e.g., in tension and compression) increases the differential, and vice versa. Increasing the cross-sectional width of the jacket 112 through the bend axis B relative to the third axis Z increases the differential. One of skill in the art of fiber optic cable design will recognize still other ways to adjust the relative flexural rigidity of the preferential and non-preferential planes BL, ZL in order to achieve a differential in the range(s) disclosed herein.

Figure 4:
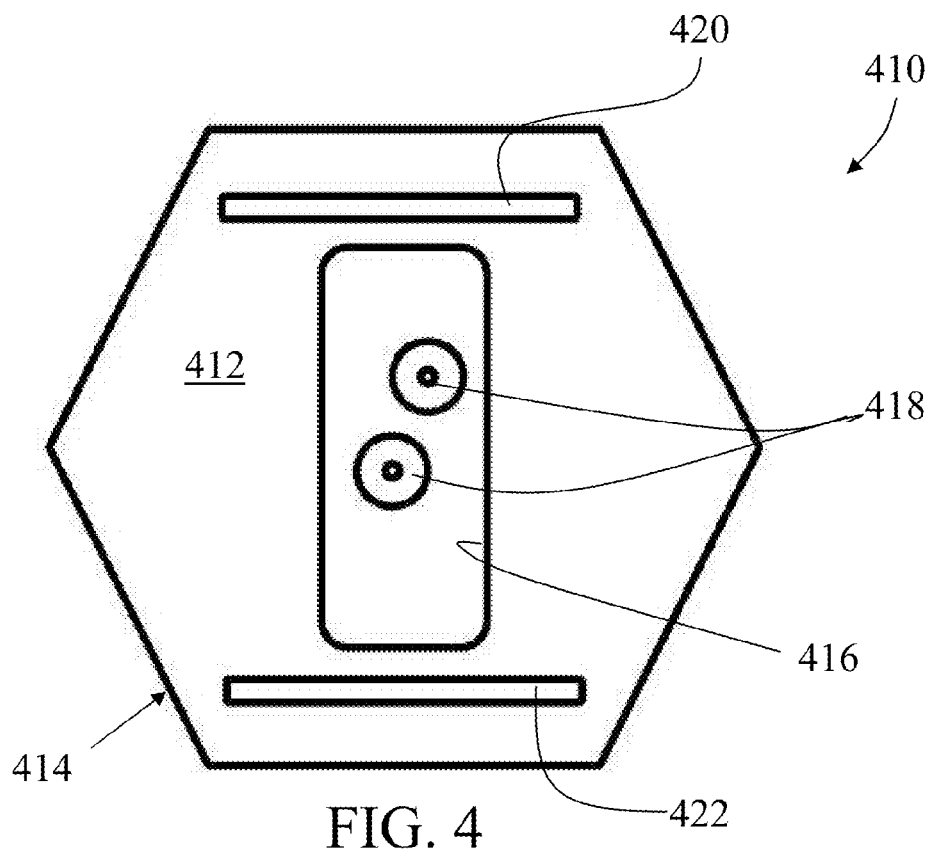

In some embodiments, the flexural rigidity of each strength elements 120, 122 is less than 200 N·m². In at least one embodiment, the first and second longitudinal strength elements 120, 122 are entirely formed from stranded stainless steel (e.g., 30 lb. 7-strand 304 stainless steel wires). In other embodiments, the strength elements 120, 122 may be formed from a dielectric material, such as glass-reinforced plastic rods or flat sheets of polyvinyl chloride (see, e.g., armor 420, 422 shielding the optical fibers 418, the sheets embedded in the narrower portions of the jacket 412, as shown in FIG. 4, linearly extending fully over and beyond the narrower ends of the cavity 416, where such sheets or other shapes may be co-extruded with the jacket 412), or other materials.

According to an exemplary embodiment, the strength elements 120, 122 (e.g., strength elements 120, 122 as shown in FIG. 1) are fully embedded (e.g., completely surrounded) in the jacket 112 and separated from the cavity 116 by an interior portion of the jacket 112. Separating the strength members from the jacket in cables of such size has been found to improve the performance of the optical fibers by providing space for the fibers to move in the cavity, even when bending forces drive the strength elements toward the center (i.e., in bending on the non-preferential plane ZL). With the strength elements fully embedded, the optical fibers are not pinched between the strength members, or between one of the strength members and a wall of the cavity. Furthermore, Applicants have found that the embedded strength members minimize plastic creep under compressive load, improving crush performance; oppose jacket shrinkage during temperature extremes; and also limit jacket elongation (stretching) under tensile loading.

According to an exemplary embodiment, the fiber optic cable 110 is particularly small (e.g., a size normally susceptible to spontaneous knotting or tangling), and configured for use between a computer and peripheral device, such as computer drive and a portable projector. Other uses are contemplated (e.g., jumper cable in data center, furcation leg of harness cable), such as where space is at a premium. In some such embodiments, the largest dimensions of the outer periphery (orthogonal to the length L of the cable 110) is less than five millimeters, such as less than three millimeters. For example, in a round embodiment, the outer diameter is less than three millimeters.

In some such embodiments, the cable 110 includes more than one optical fiber 118, such as four optical fibers. In contemplated embodiments, 8 fibers are used, and in other contemplated embodiments ribbons of optical fibers are used, such as an 8-fiber ribbon or four×2-fiber ribbons. According to an exemplary embodiment, the optical fibers 118 (or multiple ribbons) are each free to move within the cavity 116 and move relative to one another as the cable is manipulated to relieve stress on the fibers 118. In some embodiments, when the cable 110 is fully bent back upon itself about the bend axis B, the bend radius of the optical fiber 118 in the cavity 116 is still greater than the diameter of the cable 110, due at least in part to the freedom of movement of the optical fiber 118 within the cavity 116. According to an exemplary embodiment, the optical fiber(s) of the cables disclosed herein are tight-buffered. In other embodiments, optical fiber(s) may not be tight-buffered, but may be in buffer tubes. In some embodiments, the optical fiber(s) are multi-core fibers, where numerous glass cores share a common cladding, allowing for a smaller cable structure.

According to some embodiments, the cavity shape is asymmetric in cross-section, and includes a single portion 124 (e.g., extension, projection) that is closer to the exterior periphery 114 of the cable 110 than any other portion of the cavity 116. In some such embodiments, the cable 110 further includes a single access member 126 (e.g., a lone ripcord) embedded in the jacket between the single portion 124 of the cavity 116 and the exterior periphery 114 of the cable 110. The submerged location of the embedded ripcord 126 may be marked on the outside of the cable 110, such as by laser printing, a raised surface, or other indicia. In other contemplated embodiments, the access member 126 may be conductive, and may further or alternatively serve as a ground wire.

Referring to FIG. 2, a cable 210 includes a jacket 212 having a discontinuity of material 226 (e.g., weakened section) that is co-extruded into the jacket 212 between the single portion 224 of the cavity 216 (e.g., projection) and the exterior 214 of the cable 210. In some such embodiments, the jacket 212 is formed from a first material (e.g., polymeric material, polyethylene, polyvinyl chloride) and the co-extruded discontinuity of material 226 in the jacket 212 is formed from a second material (e.g., another polymeric material, polypropylene) different than the first material, but which may also include some (e.g., less than 30% by weight) of the first material (e.g., polyethylene) mixed therein to improve cohesion of the jacket 212.

Figure 3:
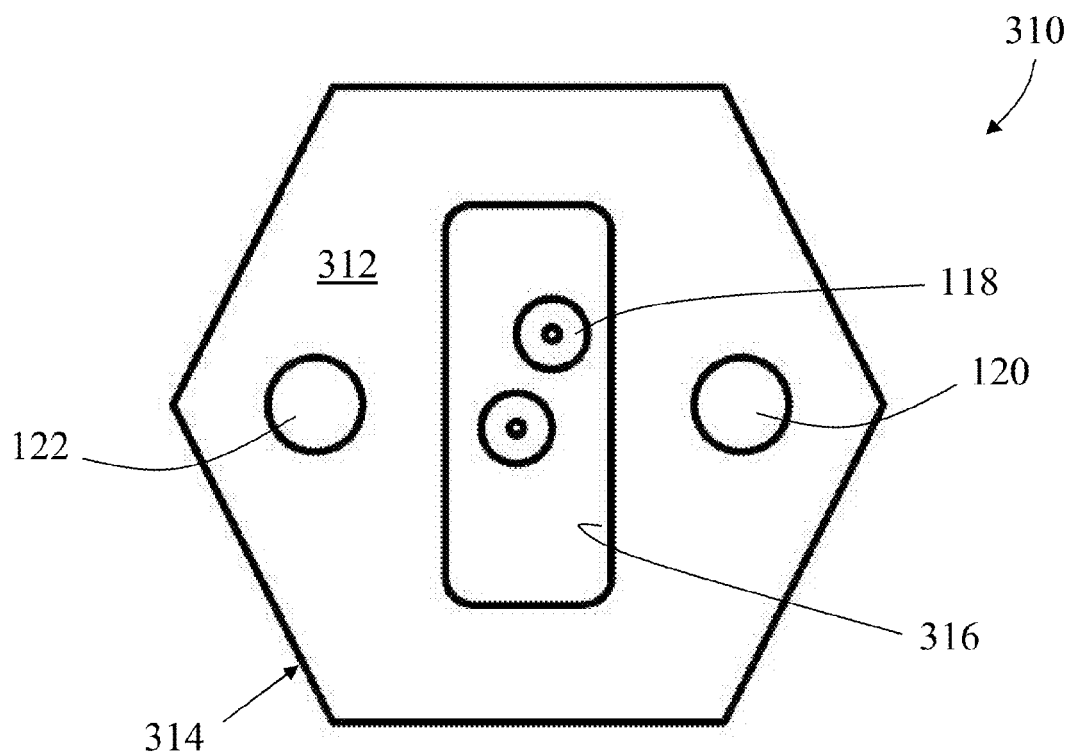

In contemplated embodiments, the cavity shape is asymmetric, but includes multiple extensions that project about the same distance toward the exterior as one another. In other contemplated embodiments, the cavity shape is not asymmetric at all, but instead is round, oblong, or rectangular having minor and major dimensions (see, e.g., symmetric cavity 316 as shown in FIG. 3). In some embodiments, the respective cable includes a symmetric or asymmetric cavity shape, but does not include either an access member or a co-extruded discontinuity of material in the jacket. In some such embodiments, the shape of the cavity alone (e.g., pointed vertices proximate to the exterior surface) may facilitate opening the cavity for access to the fibers, as necessary.

While FIGS. 1A, 1B, and 2 show the cable to be round in cross-section, in other contemplated embodiments the cable may be otherwise shaped (e.g. non-round). For example, FIGS. 3-4 show cables 310, 410 to have polygonal exterior peripheries 314, 414. Still other shapes, such as elliptical, trapezoidal, rhomboid, or asymmetric shapes are contemplated. The polygonal periphery (hexagonal in FIGS. 3-4; but, e.g., rhomboid, trapezoidal, square) of the cables 310, 410 in FIGS. 3-4 may allow for tighter packaging of a plurality of such cables, such as in a narrow duct or a larger (e.g., outdoor) cable jacket, because some such geometries could be packed together in groups without interstices, such as within a larger distribution cable jacket.

The construction and arrangements of the fiber optic cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, the jacket (e.g., jackets 112, 312 in FIGS. 1 and 3) may be a single, continuous material, or may include several layers of the same or different material that together form the jacket (e.g., polyethylene with bonded nylon skin). Also, armor 420, 420 may be used with strength elements 120, 122, and may be used in cables that are other than round or hexagonal (e.g., oval or square), and may be formed from other materials (see, e.g., U.S. application Ser. No. 12/261,645 filed Oct. 30, 2008, which is incorporated by reference herein in its entirety). Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic cable, comprising:
   a polymeric jacket defining an outer periphery and a cavity interior thereto, wherein the cavity is elongate, and wherein the outer periphery is polygonal;
   an optical fiber positioned within the cavity of the jacket;
   a first longitudinal strength element embedded in the jacket; and
   a second longitudinal strength element embedded in the jacket on an opposite side of the cavity from the first strength longitudinal member,
   wherein the first and second longitudinal strength elements define a bend axis of the cable passing through the strength elements that is orthogonal to the length of the cable, whereby the bend axis and the length of the cavity define a preferential plane for bending, wherein the cable resists bending about a third axis that is orthogonal to the length of the cable and also orthogonal to the bend axis, whereby the third axis and the length of the cable define a non-preferential plane for bending;
   wherein the cable resists bending in the non-preferential plane by no more than five times as much as the cable resists bending in the preferential plane.

2. The fiber optic cable of claim 1, wherein the cable resists bending in the non-preferential plane by at least twice as much as the cable resists bending in the preferential plane, but wherein the cable resists bending in the non-preferential plane by no more than four times as much as the cable resists bending in the preferential plane.

3. The fiber optic cable of claim 1, wherein the flexural rigidity of each strength member is less than 200 $Nm^2$.

4. The fiber optic cable of claim 1, wherein the first and second longitudinal strength elements consist of stranded stainless steel.

5. The fiber optic cable of claim 1, further comprising at least another optical fiber in the cavity, wherein the optical fibers are configured to move within the cavity and configured to move relative to one another.

6. The fiber optic cable of claim 5, wherein the largest dimensions of the outer periphery orthogonal to the length of the cable is less than three millimeters.

7. The fiber optic cable of claim 6, wherein when the cable is fully bent back upon itself about the bend axis, the bend radius of the optical fiber in the cavity is greater than or equal to 1.5 millimeters.

8. The fiber optic cable of claim 5, wherein when the cable is fully bent back upon itself about the bend axis, the bend diameter of the optical fiber in the cavity is greater than the largest dimensions of the outer periphery orthogonal to the length of the cable.

9. The fiber optic cable of claim 5, wherein the cavity is asymmetric and includes a single portion closer to the exterior of the cable than any other portion of the cavity.

10. The fiber optic cable of claim 9, further comprising a single access member embedded in the jacket between the single portion of the cavity and the exterior of the cable.

11. The fiber optic cable of claim 10, wherein the single access member is a ripcord.

12. The fiber optic cable of claim 5, further comprising a co-extruded discontinuity of material in the jacket between the single portion of the cavity and the exterior of the cable.

13. The fiber optic cable of claim 12, wherein the jacket comprises a first material and the co-extruded discontinuity of material in the jacket comprises a second material different than the first material but comprising the first material.

14. The fiber optic cable of claim 5, wherein the optical fibers are tight buffered.

15. The fiber optic cable of claim 5, wherein the cable is round in cross-section.

16. The fiber optic cable of claim 5, wherein the cable only includes two strength members embedded in the jacket.

17. The fiber optic cable of claim 16, wherein the strength members are formed from a dielectric material.

18. The fiber optic cable of claim 17, wherein the strength members comprise a polymer.

19. A fiber optic cable, comprising:
a polymeric jacket defining an outer periphery and a cavity interior thereto, wherein the cavity is elongate, wherein the largest dimensions of the outer periphery orthogonal to the length of the cable is less than three millimeters, and wherein the outer periphery is polygonal;
an optical fiber positioned within the cavity of the jacket;
a first longitudinal strength element fully embedded in the jacket; and
a second longitudinal strength element fully embedded in the jacket on an opposite side of the cavity from the first strength longitudinal member.

20. The fiber optic cable of claim 19, wherein the first and second longitudinal strength elements define a bend axis of the cable passing through the strength elements that is orthogonal to the length of the cable, whereby the bend axis and the length of the cavity define a preferential plane for bending, wherein the cable resists bending about a third axis that is orthogonal to the length of the cable and also orthogonal to the bend axis, whereby the third axis and the length of the cable define a non-preferential plane for bending; wherein the cable resists bending in the non-preferential plane by at least twice as much as the cable resists bending in the preferential plane, but wherein the cable resists bending in the non-preferential plane by no more than five times as much as the cable resists bending in the preferential plane.

* * * * *